United States Patent
Hall et al.

(10) Patent No.: US 10,612,386 B2
(45) Date of Patent: Apr. 7, 2020

(54) APPARATUS FOR AIRFOIL LEADING EDGE PROTECTION

(71) Applicant: Rolls-Royce Corporation, Indianapolis, IN (US)

(72) Inventors: Christopher D. Hall, Indianapolis, IN (US); Daniel E. Molnar, Lebanon, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 324 days.

(21) Appl. No.: 15/651,156

(22) Filed: Jul. 17, 2017

(65) Prior Publication Data

US 2019/0017387 A1    Jan. 17, 2019

(51) Int. Cl.
| | |
|---|---|
| *F01D 5/14* | (2006.01) |
| *F01D 5/28* | (2006.01) |
| *F01D 5/30* | (2006.01) |
| *F01D 9/04* | (2006.01) |
| F04D 29/32 | (2006.01) |

(Continued)

(52) U.S. Cl.
CPC .......... *F01D 5/147* (2013.01); *F01D 5/288* (2013.01); *F01D 5/3023* (2013.01); *F01D 9/041* (2013.01); *F01D 9/042* (2013.01); *B64C 11/205* (2013.01); *F04D 29/324* (2013.01); *F04D 29/388* (2013.01); *F05D 2220/32* (2013.01); *F05D 2220/36* (2013.01); *F05D 2240/121* (2013.01); *F05D 2240/303* (2013.01); *F05D 2300/702* (2013.01)

(58) Field of Classification Search
CPC ........ F01D 5/147; F01D 5/288; F01D 5/3023; F01D 9/041; F01D 9/042; F01D 5/141; B64C 11/205; F04D 29/324; F04D 29/388; F04D 29/2294; F05D 2220/32; F05D 2220/36; F05D 2240/121; F05D 2240/303; F05D 2300/702
USPC ......................................................... 416/224
See application file for complete search history.

(56) References Cited

U.S. PATENT DOCUMENTS

| | | | |
|---|---|---|---|
| 3,836,282 A | * | 9/1974 | Mandelbaum .......... F01D 9/042 415/209.4 |
| 4,006,999 A | | 2/1977 | Brantley et al. |

(Continued)

FOREIGN PATENT DOCUMENTS

| | | |
|---|---|---|
| EP | 2022942 | 2/2009 |
| EP | 3 018 363 A1 | 5/2016 |

(Continued)

OTHER PUBLICATIONS

Extended European Search Report for European Application No. EP 18178435.6, dated Dec. 12, 2018 (7 pages).

*Primary Examiner* — Aaron R Eastman
(74) *Attorney, Agent, or Firm* — McCracken & Gillen LLC

(57) ABSTRACT

According to one aspect, an airfoil assembly for a gas turbine engine comprises a first end wall, a second end wall, an airfoil and a sheath. The first end wall has surfaces defining a first recess, and the second end wall has surfaces defining a second recess. The airfoil includes a first portion disposed in the first recess, a second portion disposed in the second recess, and a leading edge disposed between the first and second portions. The sheath is in contact with the first and second portions of the airfoil covering the leading edge between the surfaces defining the first and second recesses.

20 Claims, 8 Drawing Sheets

(51) Int. Cl.
    *F04D 29/38*    (2006.01)
    *B64C 11/20*    (2006.01)

(56)           References Cited

U.S. PATENT DOCUMENTS

| | | | |
|---|---|---|---|
| 5,449,273 | A | 9/1995 | Hertel et al. |
| 8,764,959 | B2 | 7/2014 | Smith et al. |
| 9,689,269 | B2 | 6/2017 | Bottome |
| 2006/0275626 | A1* | 12/2006 | Bernard ............... B23P 15/04 |
| | | | 428/698 |
| 2010/0008788 | A1 | 1/2010 | Barbee et al. |
| 2010/0074759 | A1* | 3/2010 | Dierksmeier ........... F01D 5/147 |
| | | | 416/241 B |
| 2010/0329880 | A1* | 12/2010 | Davis ................. B64C 27/473 |
| | | | 416/229 R |
| 2011/0070092 | A1* | 3/2011 | Gerlach ............... F01D 5/147 |
| | | | 416/230 |
| 2012/0021243 | A1 | 1/2012 | Kray et al. |
| 2012/0027604 | A1* | 2/2012 | McDonald ............ F01D 5/282 |
| | | | 416/219 R |
| 2012/0134839 | A1* | 5/2012 | Parkin ................. F01D 5/147 |
| | | | 416/230 |
| 2014/0064937 | A1* | 3/2014 | Kray .................... F01D 11/08 |
| | | | 415/173.2 |
| 2015/0298791 | A1* | 10/2015 | Nordin .................... B64C 3/28 |
| | | | 244/45 R |
| 2017/0334577 | A1* | 11/2017 | Andrzejewski ....... B64C 11/205 |

FOREIGN PATENT DOCUMENTS

| | | |
|---|---|---|
| WO | WO 2015/006488 A1 | 1/2015 |
| WO | WO 2015/160527 | 10/2015 |

\* cited by examiner

US 10,612,386 B2

APPARATUS FOR AIRFOIL LEADING EDGE PROTECTION

FIELD OF DISCLOSURE

The present subject matter relates to gas turbine engines, and more particularly, to airfoil leading edge protection in gas turbine engines.

BACKGROUND

The leading edge of an airfoil of a gas turbine engine, whether composite or metallic, is subject to damage, such as may be caused by Foreign Object Damage ("FOD") and erosion. Specifically, foreign material such as dust, sand, ice, water particulates, birds, and/or debris can erode and/or damage the leading edges of airfoils during impact when left unprotected. To reduce FOD and erosion on airfoils, strips (typically of titanium or nickel) are bonded to a portion of the leading edge thereby improving the strength of the leading edge while reducing the direct erosion and FOD to the airfoil at the location of the strip.

The use of these strips bonded to a portion of the leading edge has, however, resulted in the strips being subject to delamination and detachment from the airfoil during impact from foreign material resulting in Domestic Object Damage ("DOD") downstream of the airfoil. This is of particular concern in the case of an airfoil such as an engine section stator or fan core vane located in the front bearing housing wherein delamination of a large portion or the whole strip could cause significant DOD to the core compressor of the gas turbine.

SUMMARY

According to one aspect, an airfoil assembly for a gas turbine engine comprises a first end wall, a second end wall, an airfoil and a sheath. The first end wall has surfaces defining a first recess, and the second end wall has surfaces defining a second recess. The airfoil includes a first portion disposed in the first recess, a second portion disposed in the second recess, and a leading edge disposed between the first and second portions. The sheath is in contact with the first and second portions of the airfoil covering the leading edge between the surfaces defining the first and second recesses.

According to another aspect, an airfoil assembly for a gas turbine engine comprises an end wall, an airfoil, and a sheath. The end wall has surfaces defining a recess, and the airfoil has a first portion disposed in the recess, a second portion, and a leading edge disposed between the first and second portions. The sheath is in contact with the first and second portions of the airfoil covering the leading edge between the surface defining the first recess and the second portion.

Other aspects and advantages are inherent in the apparatus claimed and disclosed or will become apparent to those skilled in the art from the following detailed description in conjunction with the accompanying drawings wherein like numerals designate like structures throughout the specification.

DETAILED DESCRIPTION

Figure 1:
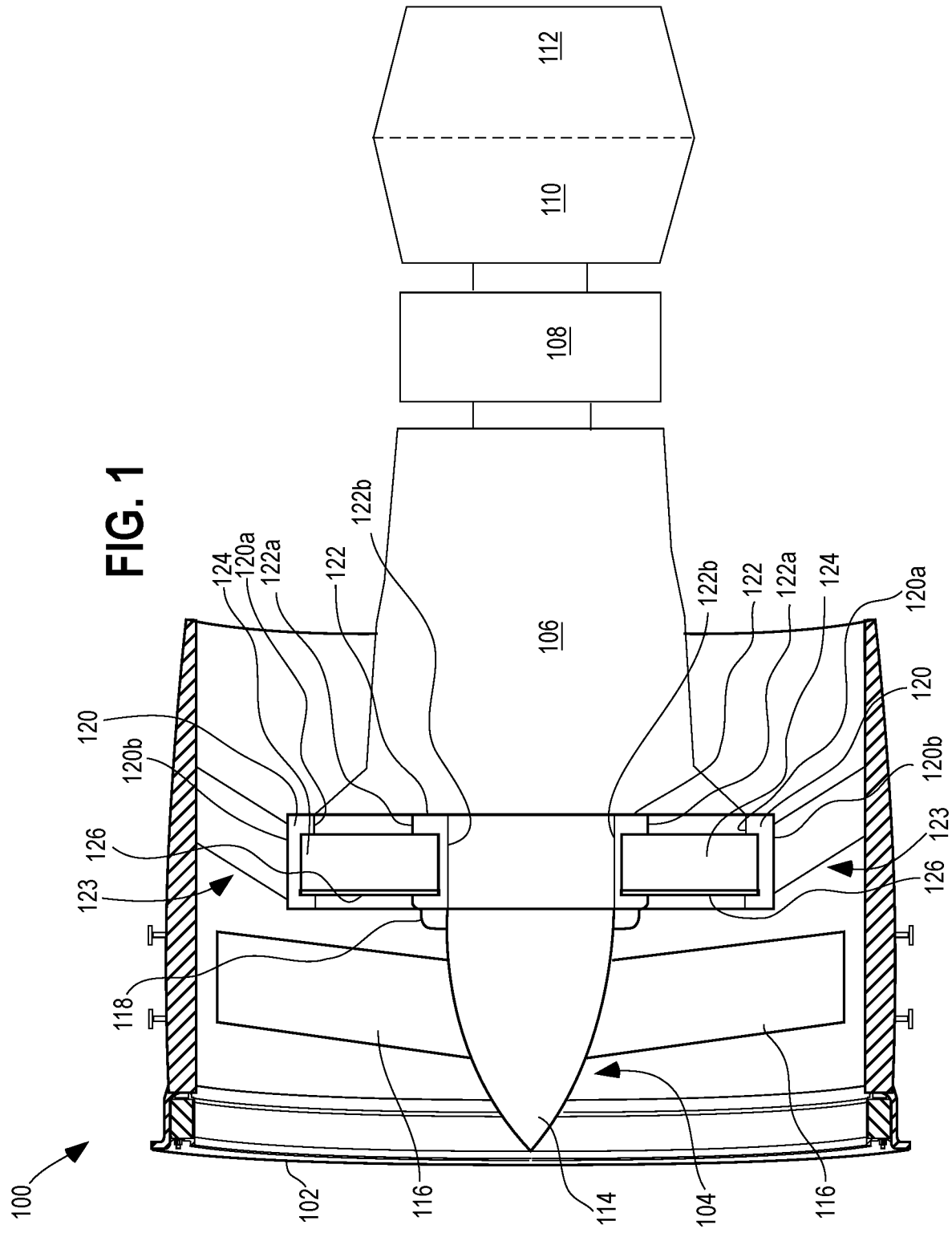
FIG. 1 is a cross-sectional view of a gas turbine engine front bearing housing, with the remainder of the gas turbine engine shown diagrammatically.

Referring now to FIG. 1, an example embodiment of an aircraft engine in the form of a gas turbine engine 100 includes an intake opening 102, a fan section 104, a compressor section 106, a combustion chamber 108 that receives compressed air from the compressor section 106, a turbine section 110 that converts rapidly expanding fuel and air into rotary motive power, and an exhaust 112. The fan section 104 includes a nose cone 114 and plurality of fan blades 116. The compressor section 106 includes a front bearing housing 118 that includes an outer end wall 120 having an inner portion 120a (with an inner surface 120a-1 and an outer surface 120a-2 not shown in FIG. 1 but shown in FIGS. 2, 4, 5, 6, and 7) and outer portion 120b, and an inner end wall 122 having an inner portion 122a (with an inner surface 122a-1 and an outer surface 122a-2 not shown in FIG. 1 but shown in FIGS. 2, 5, and 6) and outer portion 122b. It may be noted that the thickness of the outer end wall 120 and the inner end wall 122 are exaggerated for clarity. In general, the air displaced from the intake opening 102 is directed either to an air bypass 123 or between the outer end wall 120 and inner end wall 122 of the front bearing housing 118. The displaced air directed to the outer end wall 120 and inner end wall 122 encounters a plurality of airfoils 124 disposed between the outer portion 120b of the outer end wall 120 and the outer portion 122b of the inner end wall 122. Each airfoil 124 is can be made of a composite material and includes a sheath 126 in contact with the leading edge of each airfoil 124. The sheath 126 is preferably made of a metallic material or may be made of any other suitable material, such as a composite material. As shown in FIG. 1, the airfoil 124 may extend through the inner portion 120a of the outer end wall 120 and through the inner portion 122a of the inner end wall 122 and terminate within the end walls 120, 122. Alternatively, each airfoil 124 may extend fully through one of both of the end walls 120, 122 and terminate outside one or both end walls.

Figure 2:
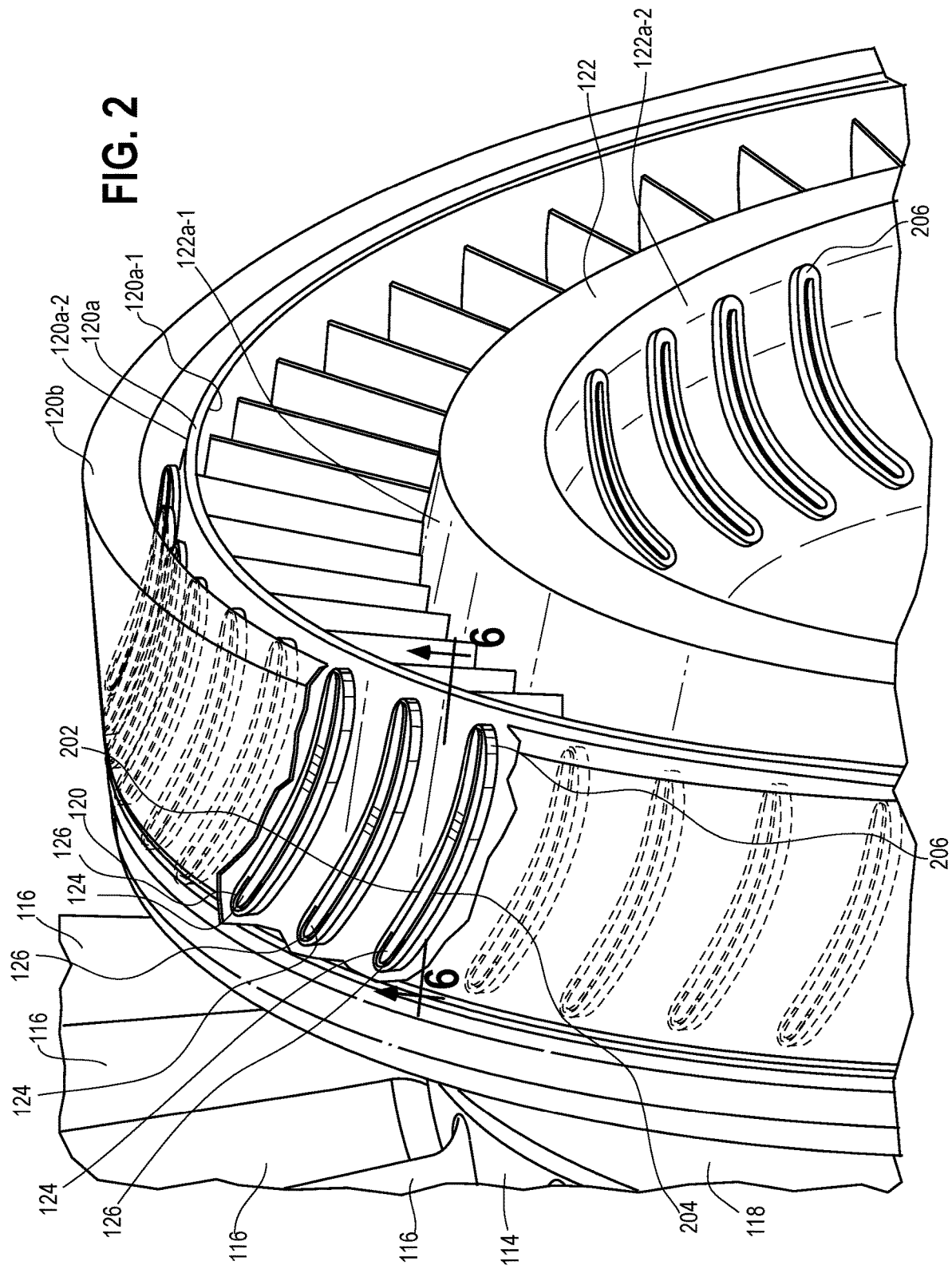
FIG. 2 is an enlarged fragmentary isometric view of a plurality of airfoils according to FIG. 4 or 5 disposed between an outer end wall and inner end wall of the gas turbine engine.

Referring now to FIG. 2, an example embodiment airfoil assembly is located behind the fan section 104, and more specifically behind the nose cone 114 and the plurality of fan blades 116 in the front bearing housing 118. As shown in FIG. 2 by the cut-away of the outer portion 120b of the outer end wall 120, each airfoil 124 has a pressure surface 202 and a suction surface 204. The pressure surface 202 is the surface with a higher static pressure as compared to the suction surface 204. The suction surface 204 is the surface with a lower static pressure as compared to the pressure surface 202. Although both surfaces experience exposure to airflow and are protected by the sheath 126, the pressure surface 202 is generally more exposed to foreign material and/or higher force impacts. Due to the higher exposure, the sheath 126 may extend axially the entire length of the pressure surface 202 or some fraction thereof. The length of the pressure surface 202 refers to the left-to-right dimension as in FIG. 2 whereas the height of the airfoil 124 refers to the distance between the end walls 120, 122. As shown in FIGS. 1, 2, and 4-7, the sheath 126 may extend the full height or substantially the full height of the associated airfoil 124 into the end walls 120, 122. Furthermore, the length of the sheath on the pressure surface 202 is preferably at least the length of the sheath on the suction surface 204. As shown in FIG. 2 and FIG. 6, illustrated example embodiments also include a plurality of resilient boots 206 disposed in associated recesses in the end walls 120, 122 each of which in turn receive an associated sheath 126 and airfoil 124. The boots 206 hold and position the airfoils 124 in place between the outer end wall 120 and inner end wall 122, dampen vibrations, and allow for some movement of the airfoils if impacted.

Figure 3:
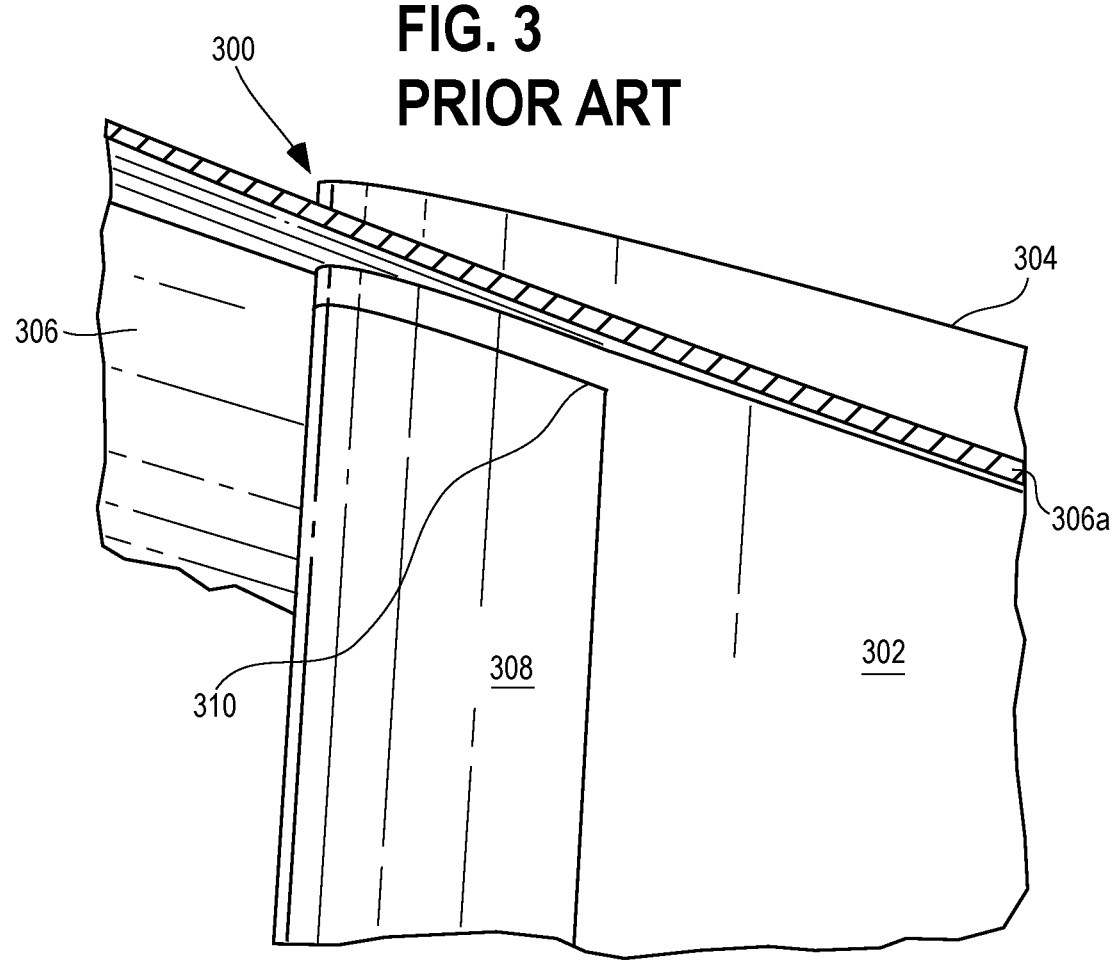
FIG. 3 is an enlarged fragmentary isometric view of a prior art metal strip bonded to an airfoil.

FIG. 3 illustrates a prior art airfoil assembly 300 comprising an airfoil 302 having an end 304 that extends fully through and beyond a portion 306a of an end wall 306, although the end 304 may instead terminate within the end wall 306. A strip 308 is bonded to the leading edge of the airfoil 302 and does not extend the full length of the airfoil 302, thereby exposing a free edge 310 of the strip 308 directly to the airflow, which may contain foreign material that can undesirably delaminate the strip 308 at the free edge 310 and possibly result in DOD. Additionally, delamination will tend to initiate at the free edge which in the case of prior art resides inside the gas path further increasing both the probability, magnitude, and propagation of a delamination.

Figure 4:
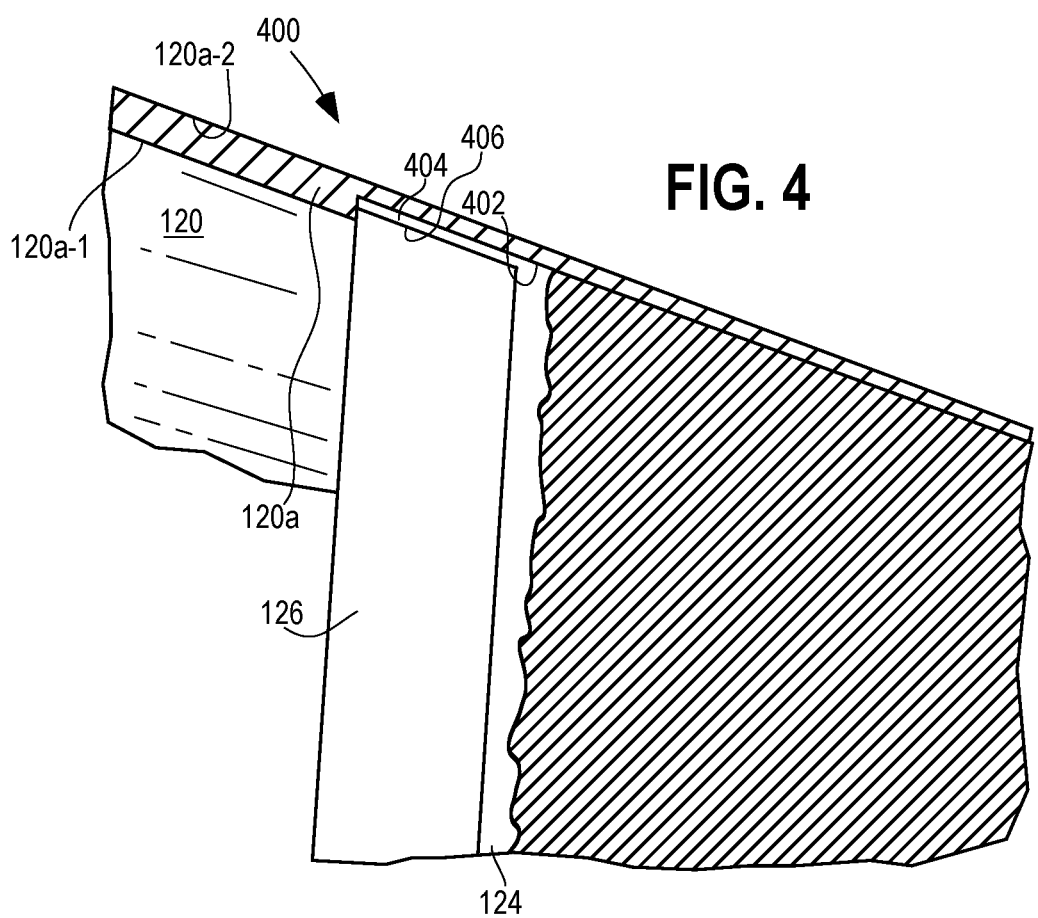
FIG. 4 is a view similar to FIG. 3 with portions broken away of an example embodiment of a sheath coupled to the airfoil and extending through an end wall of the gas turbine engine.

Referring now to FIG. 4, an example embodiment airfoil assembly 400 comprises the inner portion 120a of the outer end wall 120 with surfaces defining a recess 402 between the inner surface 120a-1 and outer surface 120a-2 of the inner portion 120a, wherein an upper end 404 of the airfoil 124 is disposed in the recess 402. The sheath 126 may be cured in the leading edge of the airfoil 124, or be disposed on the leading edge of the airfoil 124 (not shown). As shown in FIG. 4, the sheath 126 is cured in the leading edge of the airfoil 124 and extends outwardly at least to a point above the inner surface 120a-1 and up to the surfaces defining the recess 402 so that the edge 406 of the sheath 126 is located outwardly from the inner surface 120a-1 of the inner portion 120a. Curing the sheath 126 into the leading edge and positioning the edge 406 of the sheath 126 in between the inner surface 120a-1 and the recess 402 allows no edge of the sheath 126 to be directly exposed to the airflow between the outer end wall 120 and inner end wall 122, thereby improving the resistance to delamination and/or detachment of the sheath 126 from the airfoil 124.

Figure 5:
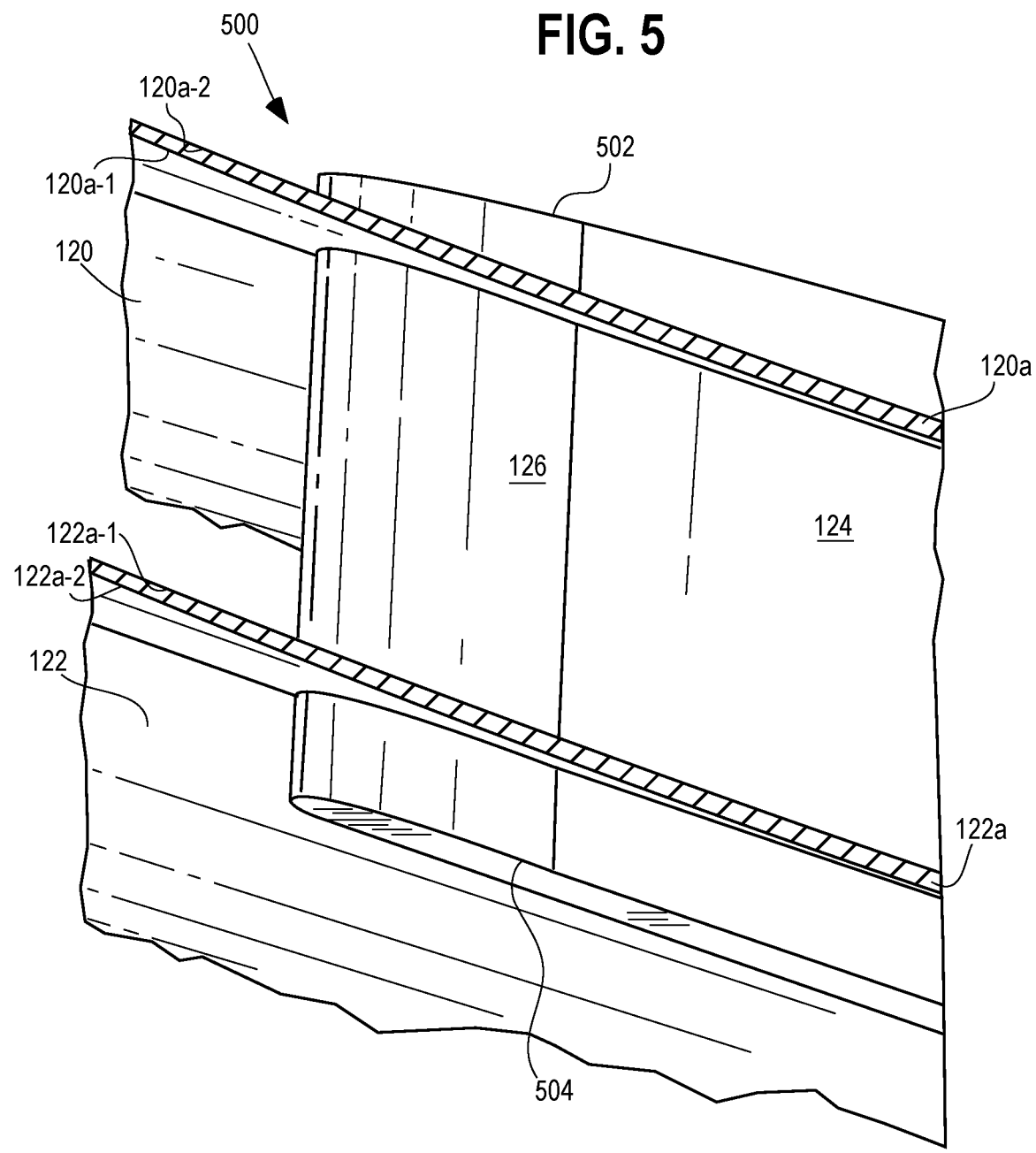
FIG. 5 is an enlarged cross-sectional view of an example embodiment of a sheath coupled to the airfoil and terminating at a surface defining a recess in an end wall of a gas turbine engine.
Figure 6:
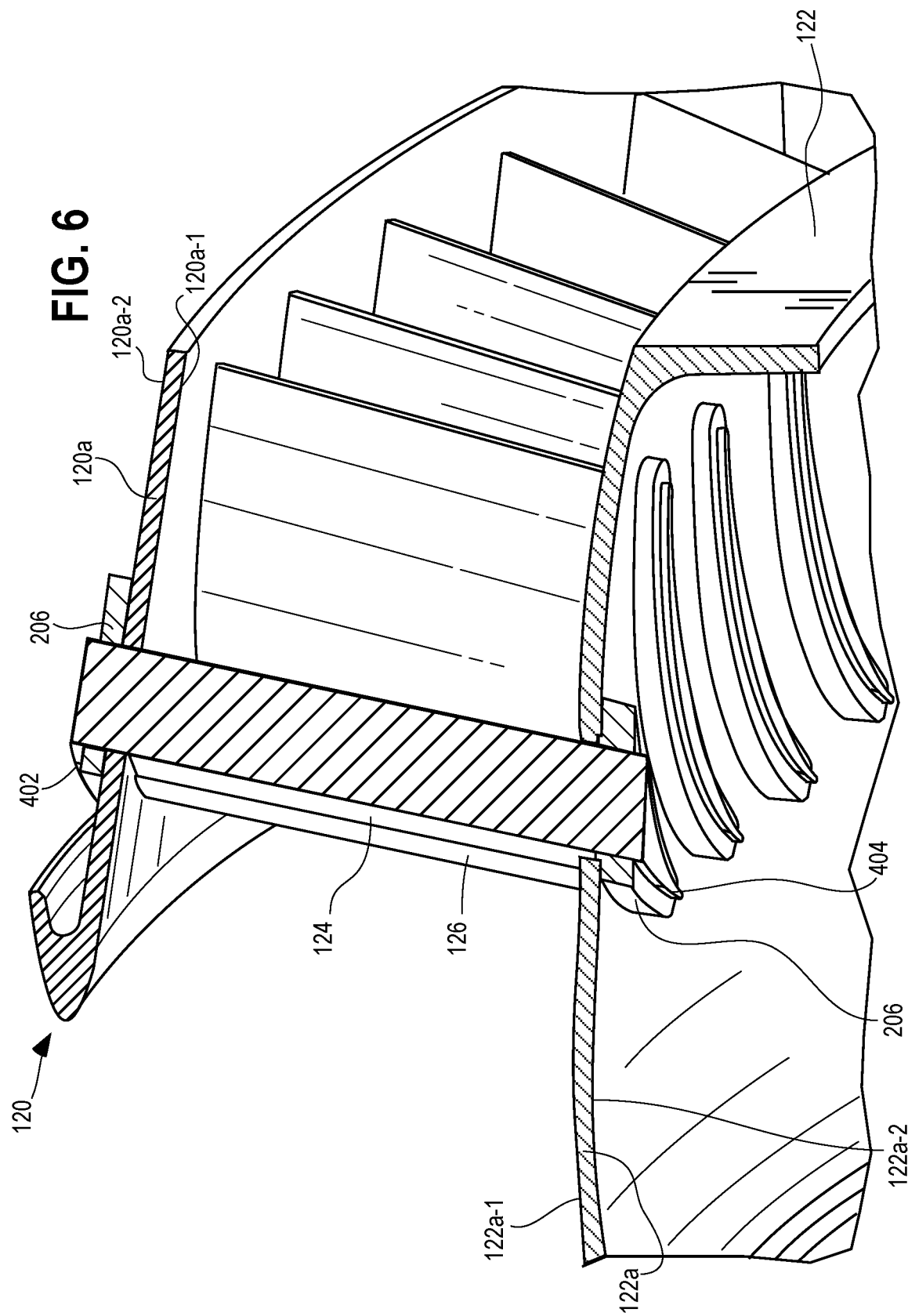
FIG. 6 is a sectional view taken generally along the lines 6-6 of FIG. 2.

Referring now to FIG. 5, an example embodiment airfoil assembly 500 includes an airfoil 124 that extends outwardly at least through the inner portion 120a of the outer end wall 120. A sheath 126 disposed on the leading edge of the airfoil 124 includes a first edge 502 that also extends at least through the inner portion 120a of the outer end wall 120. In the illustrated embodiment, the airfoil 124 also extends fully through the inner portion 122a of the inner end wall 122 together with a second edge 504 of the sheath 126. By extending through the inner portion 120a of the outer end wall 120 and the inner portion 122a of the inner end wall 122, the first edge 502 and the second edge 504 of the sheath 126 are not directly exposed to the airflow between the outer end wall 120 and inner end wall 122, thereby improving the resistance to delamination and/or detachment of the sheath 126 from the airfoil 124.

Figure 7:
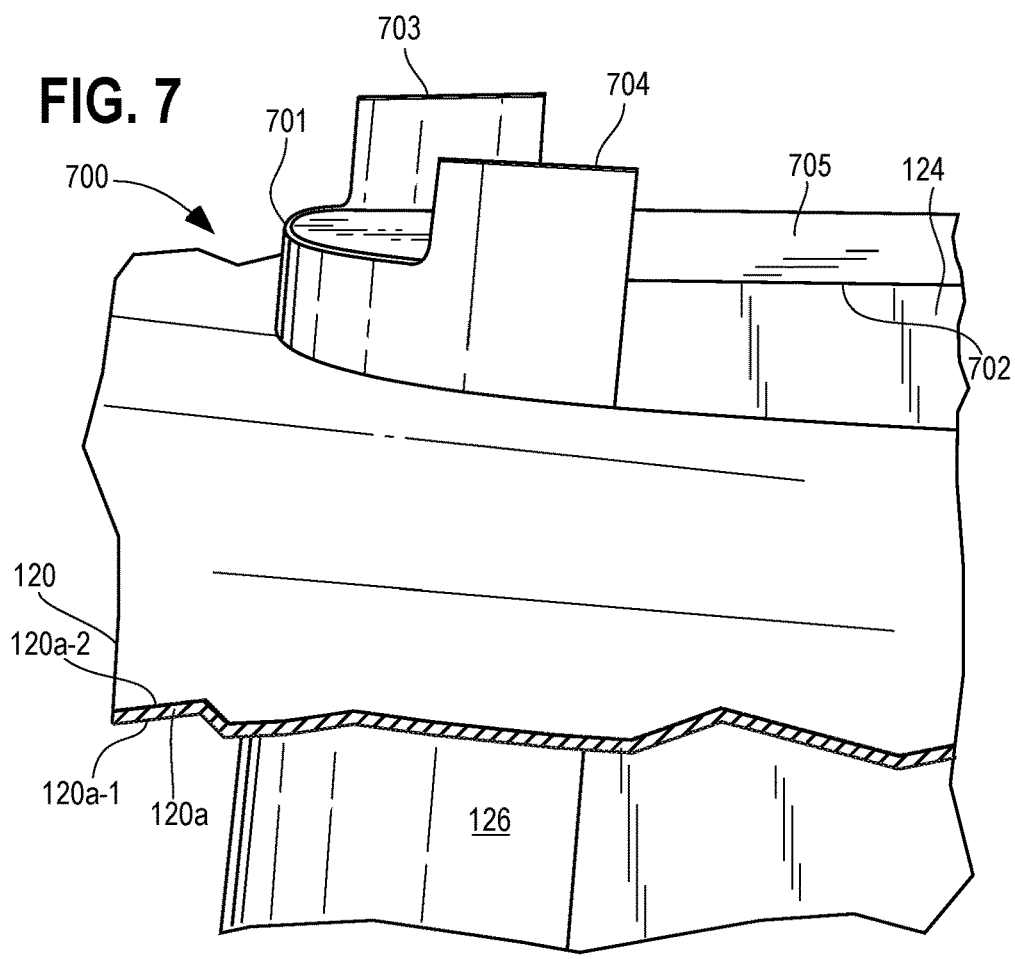
FIG. 7. is an enlarged fragmentary isometric side view of a further example embodiment sheath coupled to the airfoil and extending through an end wall of the gas turbine engine before folding of portions thereof.
Figure 8:
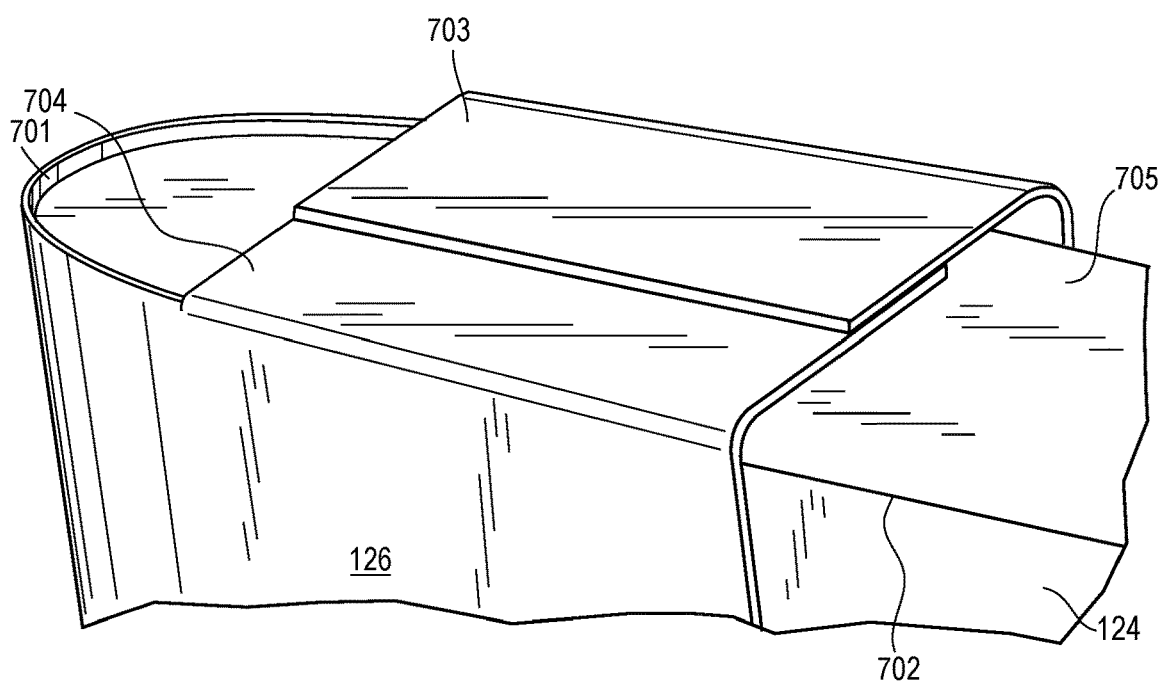
FIG. 8. is an enlarged fragmentary isometric top view of the example embodiment sheath of FIG. 7 after folding of the portions thereof.

Referring now to FIGS. 7 and 8, an example embodiment airfoil assembly 700 includes an airfoil 124 extending through the inner portion 120a of the outer end wall 120 and the sheath 126 includes an outer end portion 701 that extends outwardly from the airfoil 124 beyond an outer edge 702 of the airfoil 124 through the inner portion 120a of the outer end wall 120. The portion 701 includes a first extension member 703 and a second extension member 704. In an example embodiment (not shown), a portion corresponding to the portion 701 includes extension members, like the members 703, 704, that extend beyond an inner edge opposite the outer edge 702 of the airfoil 124. The extension members 703, 704 and the corresponding extension members at the inner part of the airfoil 124 are used to further secure the sheath 126 to the leading edge of the airfoil 124. As shown FIG. 8, the first and second extension members 703, 704 can be folded over an end surface 705 of the airfoil 124 and secured to one another using any suitable joining methodology or means so as to radially retain the sheath 126 over the end of the airfoil 124 including but not limited to adhesive bonding, welding, brazing, or a geometric interconnection. While two extension members 703, 704 are shown at the outer end portion of the sheath 126 (and two like extension members are disposed at the opposite inner end portion of the sheath 126), in alternative example embodiments any number of one or more extension members may be disposed at each sheath end and secured to one another and/or to main portions of the sheath. Radially retaining the sheath 126 over the end of the airfoil 124, further improves the resistance to FOD, DOD, or detachment of the sheath 126 from the airfoil 124. The improvement in resistance may lead to reduced service costs associated with repair and/or replacement of airfoils or airfoil assemblies as well as a reduction in deterioration of the airfoils. Since the sheath 126 may be of metallic or composite material, the improvement in resistance may lead to use of material of less weight, reducing not only cost, but improving the overall engine fuel efficiency.

Figure 9:
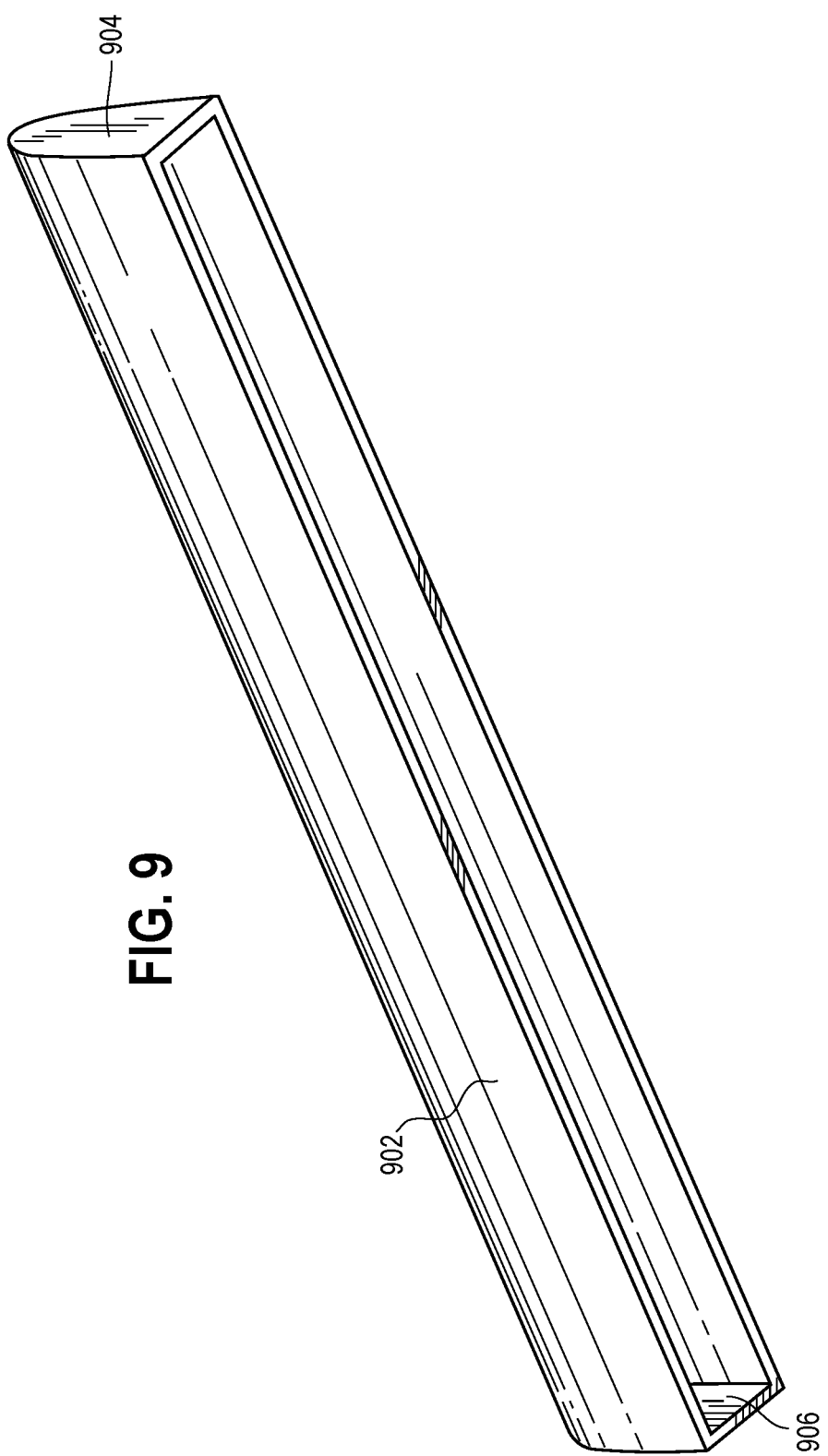
FIG. 9. is an isometric side view of yet another example embodiment sheath.

As shown in FIG. 9, an example embodiment of the sheath 126 may be of a single piece of material or segments affixed together to form a single continuous piece of material wherein the one-piece sheath 902 has a complete enclosed first end 904 and complete enclosed second end 906. Complete enclosure of both ends of the one-piece sheath 902 and capture of portions thereof by one or both of the end walls 120, 122 may improve the efficiency in installing and maintaining the sheath 902 on the leading edge of an airfoil 124.

INDUSTRIAL APPLICABILITY

In summary, the sheath disposed around the leading edge of an airfoil disposed within a surface defining a recess in at least one end wall or wherein the sheath extends outwardly from a first portion of an airfoil through at least one end wall has numerous advantages. Moreover, the use of additional retainment using at least one extension member to radially retain the sheath over an airfoil improves the resistance of the sheath to detach from the airfoil from FOD, DOD, or erosion. Moreover, improved resistance to FOD, DOD, erosion, and detachment will reduce service costs associated to replacing airfoils or airfoil assemblies. Moreover, the improved resistance may lead to the use of more composite materials in gas turbine engines, allowing for a reduction in overall weight, cost to manufacture, and with the reduction in weight may improve overall fuel efficiency.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

We claim:

1. An airfoil assembly for a gas turbine engine, comprising:
   a first end wall with surfaces defining a first recess;
   a second end wall with surfaces defining a second recess;
   an airfoil having a first portion disposed in the first recess, a second portion disposed in the second recess, and a leading edge disposed between the first and second portions wherein both of the first portion and the second portion terminate at first and second end surfaces, respectively; and
   a sheath in contact with the first and second portions of the airfoil and covering the leading edge of the airfoil between the surfaces defining the first and second recesses wherein the sheath is further disposed in contact with and covering at least portions of the first and second end surfaces.

2. The airfoil assembly for a gas turbine engine according to claim 1, wherein the sheath extends outwardly from the first portion of the airfoil through the first end wall and from the second portion of the airfoil through the second end wall.

3. The airfoil assembly for a gas turbine engine according to claim 1, wherein the sheath has at least one extension member at one end and at least one extension member at another end wherein the at least one extension member at one end is joined to at least one extension member at another end.

4. The airfoil assembly for a gas turbine engine according to claim 3, wherein the sheath is radially retained over at least one of the first and second end surfaces of the airfoil.

5. The airfoil assembly for a gas turbine according to claim 1, wherein the sheath fully encloses at least one of the first and second end surfaces of the airfoil.

6. The airfoil assembly for a gas turbine according to claim 1, wherein the sheath is disposed in the leading edge.

7. The airfoil assembly for a gas turbine according to claim 6, wherein the sheath is cured in the leading edge.

8. The airfoil assembly for a gas turbine according to claim 1, wherein the airfoil has a pressure surface and a suction surface.

9. The airfoil assembly for a gas turbine according to claim 8, wherein the sheath axially extends at most the length of the pressure surface.

10. The airfoil assembly for a gas turbine according to claim 9, wherein the length of the sheath on the pressure surface is at least the length of the sheath on the suction surface.

11. An airfoil assembly for a gas turbine engine, comprising:
    an end wall with surfaces defining a recess;
    an airfoil having a first portion disposed in the recess, a second portion, and a leading edge disposed between the first and second portions wherein the first portion and the second portions terminate at first and second end surfaces, respectively; and
    a sheath in contact with the first and second portions of the airfoil and covering the leading edge of the airfoil between the surface defining the recess and second portion and wherein the sheath is further in contact with and covering at least a portion of each of the first and second end surfaces.

12. The airfoil assembly for a gas turbine engine according to claim 11, wherein the sheath extends outwardly from the first portion of the airfoil through the end wall.

13. The airfoil assembly for a gas turbine engine according to claim 11, wherein the sheath has at least one extension member at one end and at least one extension member at another end wherein the at least one extension member at one end is joined to at least one extension member at another end.

14. The airfoil assembly for a gas turbine engine according to claim 13, wherein the sheath is radially retained over at least one of the first and second end surfaces of the airfoil.

15. The airfoil assembly for a gas turbine according to claim 11, wherein the sheath fully encloses at least one of the first and second end surfaces of the airfoil.

16. The airfoil assembly for a gas turbine according to claim 11, wherein the sheath is disposed in the leading edge.

17. The airfoil assembly for a gas turbine according to claim 16, wherein the sheath is cured in the leading edge.

18. The airfoil assembly for a gas turbine according to claim 11, wherein the airfoil has a pressure surface and a suction surface.

19. The airfoil assembly for a gas turbine according to claim 18, wherein the sheath axially extends at most the length of the pressure surface.

20. The airfoil assembly for a gas turbine according to claim 19, wherein the length of the sheath on the pressure surface is at least the length of the sheath on the suction surface.

* * * * *